Sept. 22, 1936. O. R. BRANDENBURG 2,055,025
DENTAL SPATULA
Filed July 5, 1934
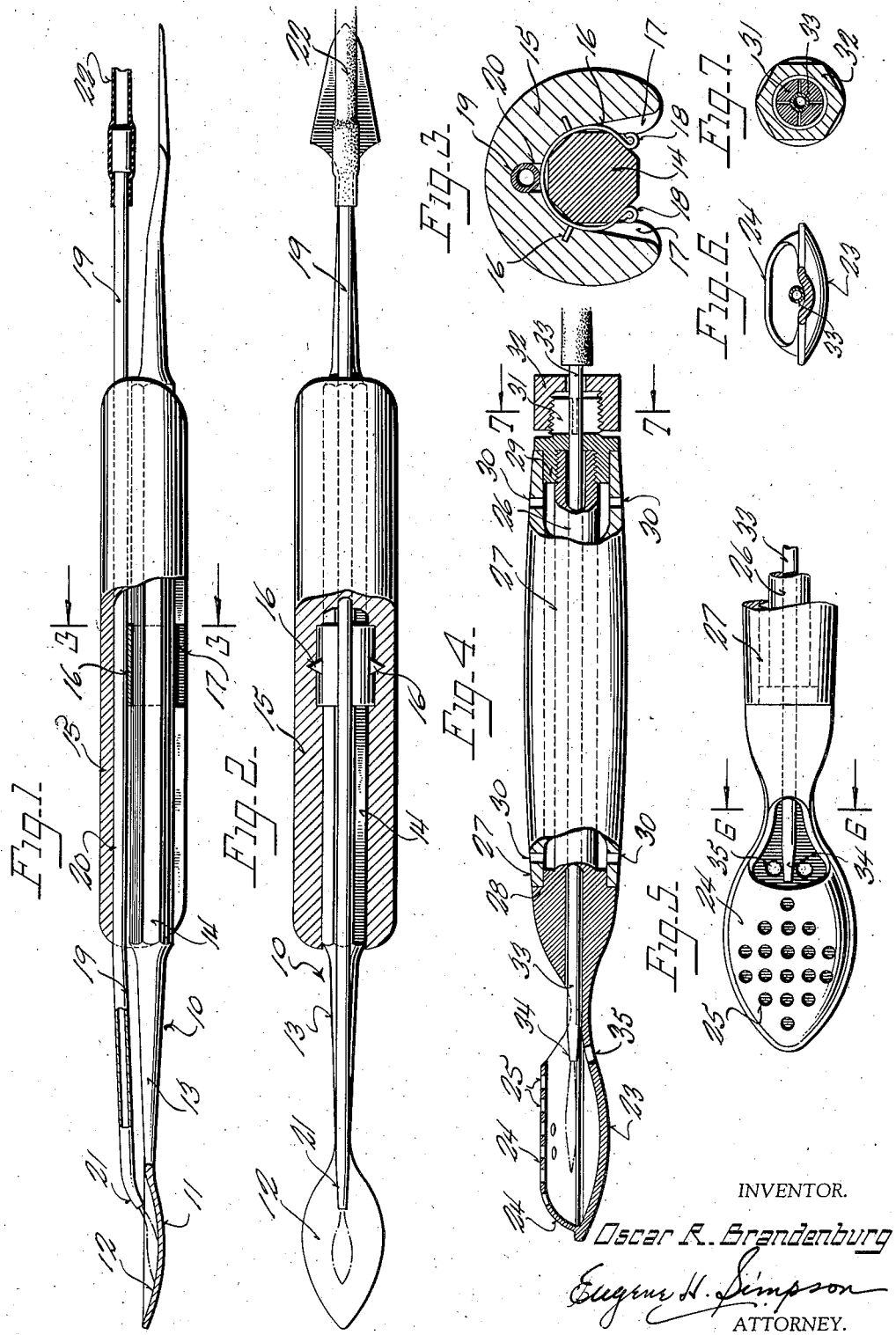
INVENTOR.
Oscar R. Brandenburg
Eugene H. Simpson
ATTORNEY.

UNITED STATES PATENT OFFICE 2,055,025

DENTAL SPATULA

Oscar R. Brandenburg, Milwaukee, Wis.

Application July 5, 1934, Serial No. 733,788

1 Claim. (Cl. 32—70)

This invention relates to dental spatulas and more particularly to a dental spatula in which the blade is constantly heated.

An object of the invention is to provide a dental spatula, for use in mechanical dentistry, in which heat is constantly applied directly to the blade.

Another object of the invention is to provide a removable heating element which may be applied to a standard spatula to convert it into a constantly heated spatula.

Further objects of the invention are to simplify the construction of constantly heated dental spatulas, improve the efficiency thereof, and reduce the cost of manufacture.

The invention contemplates a removable handle adapted to receive and clamp on the handle of a standard spatula, and containing a conductor for a fuel to be burnt directly over the working surface of the spatula blade.

The invention further contemplates a spatula having a heating chamber built on the spatula blade and receiving heat from a heating element in the chamber to constantly heat the instrument.

The invention is illustrated in the accompanying drawing and described in the following specification and the specific novelty is recited in the appended claim.

In the drawing:

Fig. 1 is an elevational view, partly in cross section, of a dental spatula, with the automatic heater shown applied.

Fig. 2 is a plan view partly in section, of the spatula shown in Fig. 1.

Fig. 3 is an enlarged cross section on the line 3—3 of Fig. 1, looking in the direction of the arrows.

Fig. 4 is an elevational view, partly in cross section of a spatula having a heating chamber built onto the blade.

Fig. 5 is a plan view of the heating chamber of the spatula shown in Fig. 4.

Fig. 6 is a cross section on the line 6—6 of Fig. 5, looking in the direction of the arrows.

Fig. 7 is a cross section on the line 7—7 of Fig. 4, looking in the direction of the arrows.

Referring to the drawing in which like numerals indicate like parts throughout the several views, and referring particularly to Figs. 1, 2, and 3, a standard dental spatula 10 is shown as having a convex spatula blade 11 with a concave cavity 12 on the upper side thereof. The spatula has a shank 13 connecting the spatula blade 11 with a handle 14, which is usually octagonal in shape, as shown in Fig. 3.

A handle 15 made of wood or any composition having poor heat conducting qualities is adapted to fit over the handle 14, and has a clamp 16, fastened in a cavity 17, in the handle, by tabs 18. The clamp 16 fits over the spatula handle and clamps underneath as shown in Fig. 3, to hold the handle 15 in place.

A gas tube 19 fits in a longitudinal recess 20 through the handle and may be held therein by the clamp 16 in the manner shown in Fig. 3.

The gas tube is drawn toward a point on the end thereof as shown at 21 and provided with a very fine aperture of such a size that the gas emerging therefrom will burn with a pure blue flame, without the introduction of air within the tube 19. The size of the opening should also be limited so that a very short flame is obtained, which will not project over the edges of the concave cavity 12.

Gas is supplied to the tube 19 through a suitable hose 22 connected to a gas supply.

Another form of spatula embodying the principles set forth is shown in Figs. 4 to 7 inclusive. In this spatula, a blade 23 has a lower convex and an upper concave surface. The upper concave surface is covered with a hood 24 which partly encloses the space over the spatula and forms a heating chamber. The heating chamber insures against the flame passing over the edge of the spatula and destroying the wax already spatulated. Apertures 25 are provided in the upper and side surfaces of the heating chamber to let out burnt gases and to supply a certain amount of air to support combustion. The main entrance for air to support combustion is through the unhooded portion of the spatula adjacent the handle and through apertures 35 through the spatula, adjacent the handle.

The spatula blade 23 is mounted on a hollow shaft 26 which carries a handle 27. The handle is held on the shaft 26 by a shoulder 28 on the forward end, and by a nut 29 on the other end. The shoulder and the nut support the handle 27 in spaced relation to the shaft 26. Apertures 30 through the handle connect the interior of the handle with the outside air and form a ventilating passage therethrough. The nut 29 has a threaded split extension 31 on the outer end thereof which receives a clamp nut 32 and forms a clutch which grips a gas tube 33 passing through the apertured shaft 26. The gas tube 33 has a jet 34 similar to the jet 21 which is adapted to project a flame into the chamber and heat the spatula.

For spatulas requiring less heat, a smaller opening may be provided in the jet 34, in which event the hood 24 may be left open at the top.

It is obvious that, while gas presents advantages as a heating unit, an electric resistance unit may be used in place of the gas unit, with the electricity conducted through wires mounted in a tube very similar to the gas tubes shown.

It is realized that this invention is subject to various changes and modifications without departing from the essence of the invention. It is not, therefore, desired to limit the invention to the precise form herein shown and described, but only by the scope of the appended claim.

What is claimed as new and desired to secure by Letters Patent is:

A dental spatula for use in molding wax in mechanical dentistry, comprising a handle, a spatula blade carried by said handle, said blade having a working surface for spatulating wax, a heating chamber on the surface of the blade opposite said working surface, said chamber having a plurality of apertures therein in the side of the chamber opposite said blade, to permit proper combustion of the fuel within the chamber, and a gas tube mounted in said handle and adapted to project a flame into the heating chamber to heat the heating surface.

OSCAR R. BRANDENBURG.